United States Patent
Dultz et al.

(10) Patent No.: US 6,563,980 B1
(45) Date of Patent: May 13, 2003

(54) METHOD AND DEVICE FOR SPECTRAL LEVEL BALANCING IN WAVELENGTH DIVISION MULTIPLEX MULTI-CHANNEL SYSTEMS

(75) Inventors: Wolfgang Dultz, Frankfurt (DE); Leonid Beresnev, Columbia, MD (US); Reinald Ries, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/529,535

(22) PCT Filed: Sep. 30, 1998

(86) PCT No.: PCT/EP98/06208
§ 371 (c)(1),
(2), (4) Date: Apr. 14, 2000

(87) PCT Pub. No.: WO99/19768
PCT Pub. Date: Apr. 22, 1999

(30) Foreign Application Priority Data
Oct. 14, 1997 (DE) .......................... 197 45 323

(51) Int. Cl.[7] ............................................. G02B 6/26
(52) U.S. Cl. ............................ 385/27; 385/33; 385/37
(58) Field of Search ........................ 385/4, 27, 140, 385/48, 30

(56) References Cited

U.S. PATENT DOCUMENTS

| | | | | |
|---|---|---|---|---|
| 5,007,705 A | * | 4/1991 | Morey et al. | 350/96.29 |
| 5,363,221 A | | 11/1994 | Philip et al. | 359/11 |
| 5,699,377 A | * | 12/1997 | Pan | 372/92 |
| 5,805,759 A | * | 9/1998 | Fukushima | 385/140 |
| 5,844,704 A | * | 12/1998 | Song et al. | 359/138 |

FOREIGN PATENT DOCUMENTS

EP    0 715 191    6/1996 ............ G02B/6/16

OTHER PUBLICATIONS

*Parker et al., Dynamic Holographic Spectral Equalization for WDM Apr. 1997, pp. 529–553, IEEE Photonics Technology Letters, Bd. 9, Nr. 4.
*Guena et al., 120×100 Pixel Antiblooming Array Based on Optically Addressed Ferroelectric Liquid–Crystal Cells, Jul. 1, 1994, pp. 1001–1003, Bd. 9, Nr. 13.
*Liu et al., Ingaas Photodiodes for Infrared–Sensitive Optically Addressed Spatial Light Modulators, Mar. 17, 1997, pp. 138–140.

* cited by examiner

Primary Examiner—Cassandra Spyrou
Assistant Examiner—Arnel C. Lavarias
(74) Attorney, Agent, or Firm—Kenyon & Kenyon

(57) ABSTRACT

WDM multi-channel systems for large distances having a number of intensifiers may cause an increase in intensifications, which lead to considerable differences in intensity, even given modest wavelength dependence, making spectral leveling maybe necessary. The light from the fiber is first spectrally into channels, and, thus locally separated, projected onto the surface of an optic limiter based on an OASLM (optical addressed, spatial light modulator), in which the intensive channels are overproportionally attenuated. The tension dependence of liquid crystal cells, derived from exposure, is used to level the WDM channels. Lastly, the channels are again imaged onto a point and coupled into another fiber. The invention is used in WDM multi-channel systems for large distances a number of intensifiers.

1 Claim, 3 Drawing Sheets

METHOD AND DEVICE FOR SPECTRAL LEVEL BALANCING IN WAVELENGTH DIVISION MULTIPLEX MULTI-CHANNEL SYSTEMS

FIELD OF THE INVENTION

The present invention relates to a method and a device for spectral level balancing in wavelength division multiplexing (WDM) multi-channel systems.

RELATED TECHNOLOGY

Spectral level balancing is described, for example, in H. HULTZSCH: *Optische Telekommunikationssysteme* [Optical Telecommunications Systems]; Gelsenkirchen 1996, p. 344 et seq.

WDM multi-channel systems employ a larger number of equally spaced spectral channels for optical transmission in the glass-fiber network. The transmission capacity is increased through parallel transmission, without the transmission frequencies having to be raised, i.e., a 2.5 Gbit system can be used with 20 channels for the transmission of 50 Gbit without changing the electronic components.

In general, WDM systems operate in the third optical window of telecommunications at 1550 nm, where there are suitable optical amplifiers capable of amplifying the entire multi-channel system, channel by channel. Although the amplifier basically does not distinguish between individual channels, the amplification curve $V(\lambda)$ is dependent on the spectral position of the individual channel. If a number N of amplifiers is required for greater distances, the amplification $V^N(\lambda)$ rises exponentially, which, even given a modest wavelength dependence $V(\lambda) \cdot I(\lambda)$, may lead to considerable dependences of the intensity $V^N(\lambda) \cdot I_o(\lambda)$ at the end of the transmission link. If these are no longer tolerable, suitable filters must be used to ensure a uniform spectral dependence of $V^N(\lambda) I_o(\lambda) \cdot I_o(\lambda)$ is the intensity of the channel of wavelength $\lambda$ at the input of the amplifier chain.

For spectral balancing, colored glass filters or interference filters of transmittance $D(\lambda)$ may be employed to level the channel intensities $D(\lambda) V^N(\lambda) I_o(\lambda)$ at the output. Such filters operate completely analogously to a matching filter for the color temperature of the light source to a photographic film. Their reciprocal characteristic reduces the intensity of the intense spectral channels to that of the weak ones. This works with photographic film, but not in the case of a WDM multi-channel system, because the curves $V(\lambda)$ differ greatly from amplifier to amplifier and are also time-dependent. Actually, the intensity $I_A(\lambda)$ at the output of the WDM transmission system is therefore described by $$I_A(\lambda, t) = \left( \prod_{i=1}^{N} V_i(\lambda, t) I_o(\lambda, t) \right) \quad (1)$$

Such a characteristic cannot be balanced by one single static filter. Even in the case of low time-dependence, the great dependence of the amplification curve $V_i(\lambda)$ on the amplifier i and the dependence of $I_A$ on the number of amplifiers N makes the development of a uniform level-balancing filter very difficult. This problem is made worse by other channel-dependent dispersion and damping effects, such as polarization mode dispersion.

Thus, for example, for balancing the spectral filters for WDM transmissions, in German Patent Application Nos. 432 7 103 A1 and 432 6 522 A1 multi-beam interferences of many parallel waveguides with individual phase control are proposed. These filters must be actively electronically modulated. This also purportedly holds true for filters able to be modulated electro-optically on the basis of non-linear optical materials, the filters being structured as a function of location, as described in German Patent Application No. 31 48 427 A1.

This also purportedly holds true for the filters described in Parker et al, "Dynamic Holographic Spectral Equalization for WDM." A device for spectral level balancing in WDM systems is described, the device having the following features: a single-mode fiber, holographically splitting filters as spectrally splitting elements, lenses as imaging elements and a ferroelectric liquid-crystal cell as part of an spatial light modulator (SLM).

Notably, these devices purportedly need external control using a plurality of electrical control signals which must be derived from the different intensities of the channels of the light signal and which can result in considerable expenditure.

SUMMARY OF THE INVENTION

The present invention provides a method for spectral level balancing in a wave division multiplexing multi-channel system. The method includes projecting light from a first fiber using at least one spectral splitting and at least one imaging element so as to split the light into a plurality of channels; then locally projecting the light onto the surface of an optical limiter including an optically addressed spatial light modulator so as to weaken at least one first channel of the plurality of channels more than at least one second channel of the plurality of channels using a nonlinear transmission characteristic of the optically addressed spatial light modulator; and then imaging the plurality of channels onto a point and coupling the plurality of channels into a second fiber.

DETAILED DESCRIPTION

Optically addressable spatial light modulators (OASLMs) are described in "Spatial Light Modulators," OSA—Technical Digest, ISBN 1-55752-494-7, Washington, 1997. OASLMs are made of a photoconducting layer and an electro-optical layer which is voltage-sensitive. In response to local exposure to the light, the voltage in the photoconductor collapses locally and is transmitted to the electro-optical layer, which is thereby locally changed in its transmittance or reflection characteristic and, in turn, now indicates the exposure optically. Of course, the photoconducting layer must be sensitive to the incident light exposure; the electro-optical layer is, for example, a liquid crystal which possesses optical modulator properties in wide spectral ranges. Certain materials combine the properties of the photon-sensitive and voltage-sensitive layers, such as the photorefractive crystals or polymers. The layers may be patterned and resolved into individual optical points (pixels)

in order to reduce the cross-talk between nearby image points or in order to obtain pixel-wise additional electrical intervention in the modulator.

Figure 1:
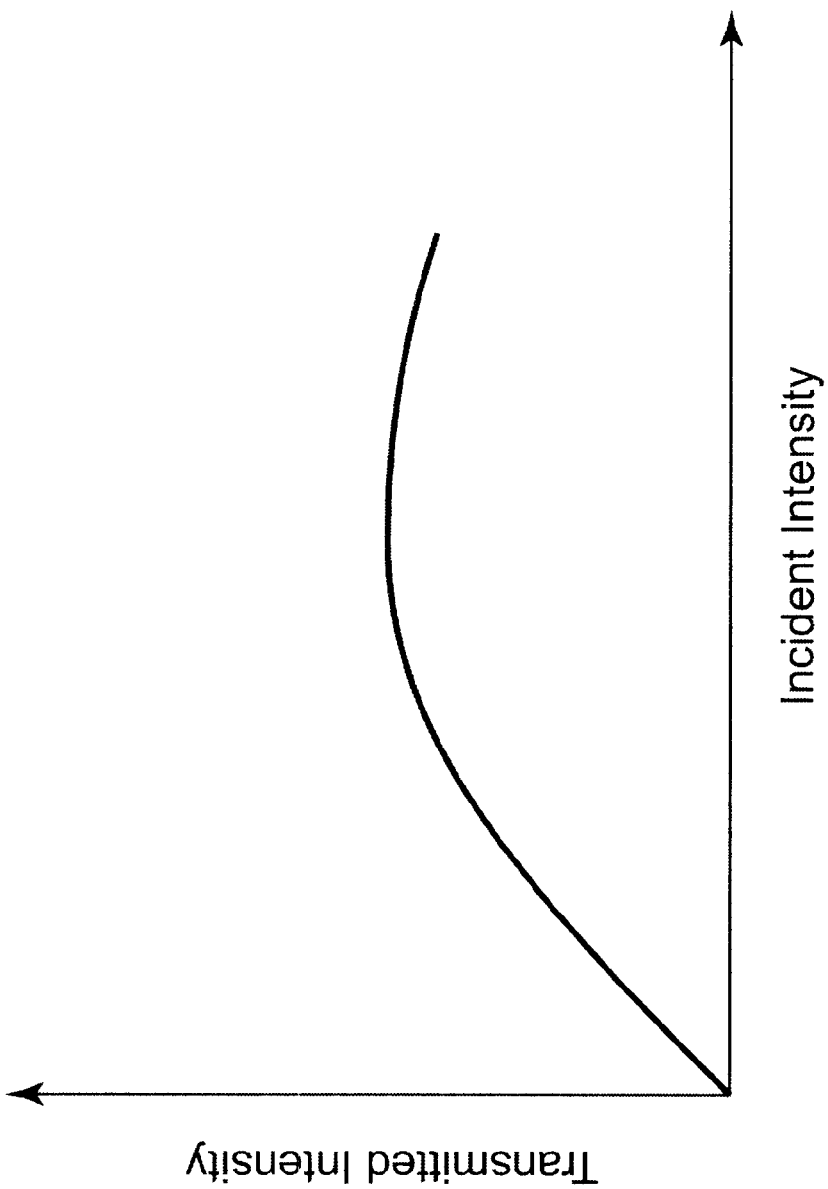
FIG. 1 shows a nonlinear characteristic of an optically addressable spatial light modulator (OASLM).

Certain liquid crystals in OASLMs have the property of being nonlinear; that is, their modulation properties with regard to light depend in nonlinear manner on the applied voltage and therefore on the illumination intensity I on the photoconductor. FIG. 1 shows a typical characteristic of a device for local attenuation of the light intensity according to German Patent Application No. 196 16 323.4. The element described therein was developed for the attenuation of strong light sources in the visible region for protection of the eye or from video cameras.

L. Wang, et al., in "Design of an optically addressed spatial light modulator sensitive to 1.55μ-write light", OSA Technical Digest, vol. 9, 1995, p. 89, and, more recently, other authors in "Spatial Light Modulators", OSA Technical Digest, ISBN 1-55752-494-7, Washington, 1997, p. 81, 84, have proposed photoconducting layers for the third optical window at 1550 nm for use in OASLMs. Embodiments of the present invention use an OASLM as an optical limiter for WDM multi-channel operation.

Figure 2:
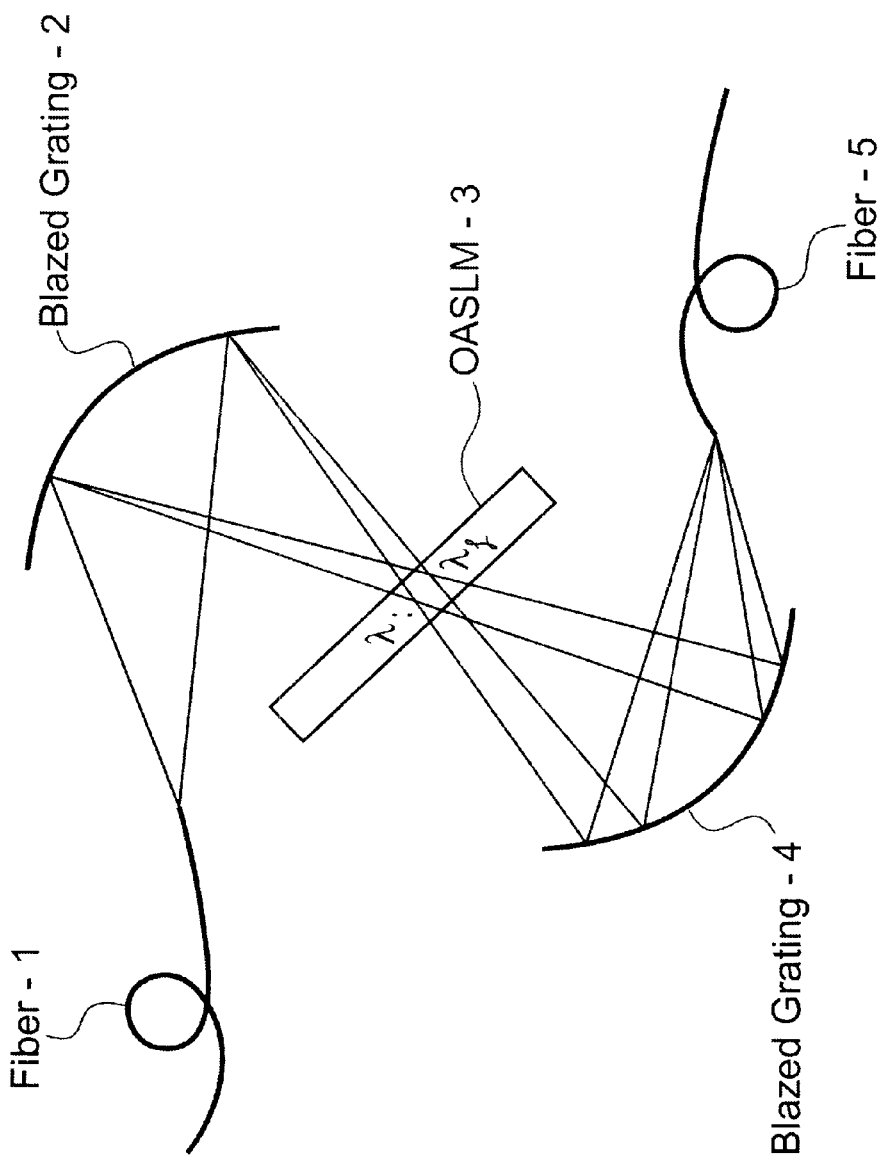
FIG. 2 shows a device with an optically addressable spatial light modulator (OASLM) between imaging gratings.

As can be seen from FIG. 2, according to the invention, an OASLM sensitive to the IR light of optical telecommunication is built into a glass-fiber link with WDM such that it levels the intensity of the spectral WDM channels. For this purpose, the light from the fiber 1 is spectrally split and projected onto the OASLM 3, so that the spectral channels are locally imaged separately from each other. The nonlinear OASLM 3 weakens the very intense channels disproportionally and levels the intensity. Subsequently, the WDM channels are imaged together again onto a point and coupled into a further fiber 5. Various types of spectral apparatuses, such as prisms, gratings or interferometers 2, 4, may be used for the spectral splitting of the WDM channels.

The imaging optics may also be selected depending on the type of spectral apparatus. In FIG. 2, convex holographic gratings 2, 4 having both spectrally splitting and imaging properties may be selected.

The spectral channels can also be reunited by a lens for recoupling into the fiber if the apparatus conditions can be met. The important aspect is the number and splitting of the individual WDM channels.

Figure 3:
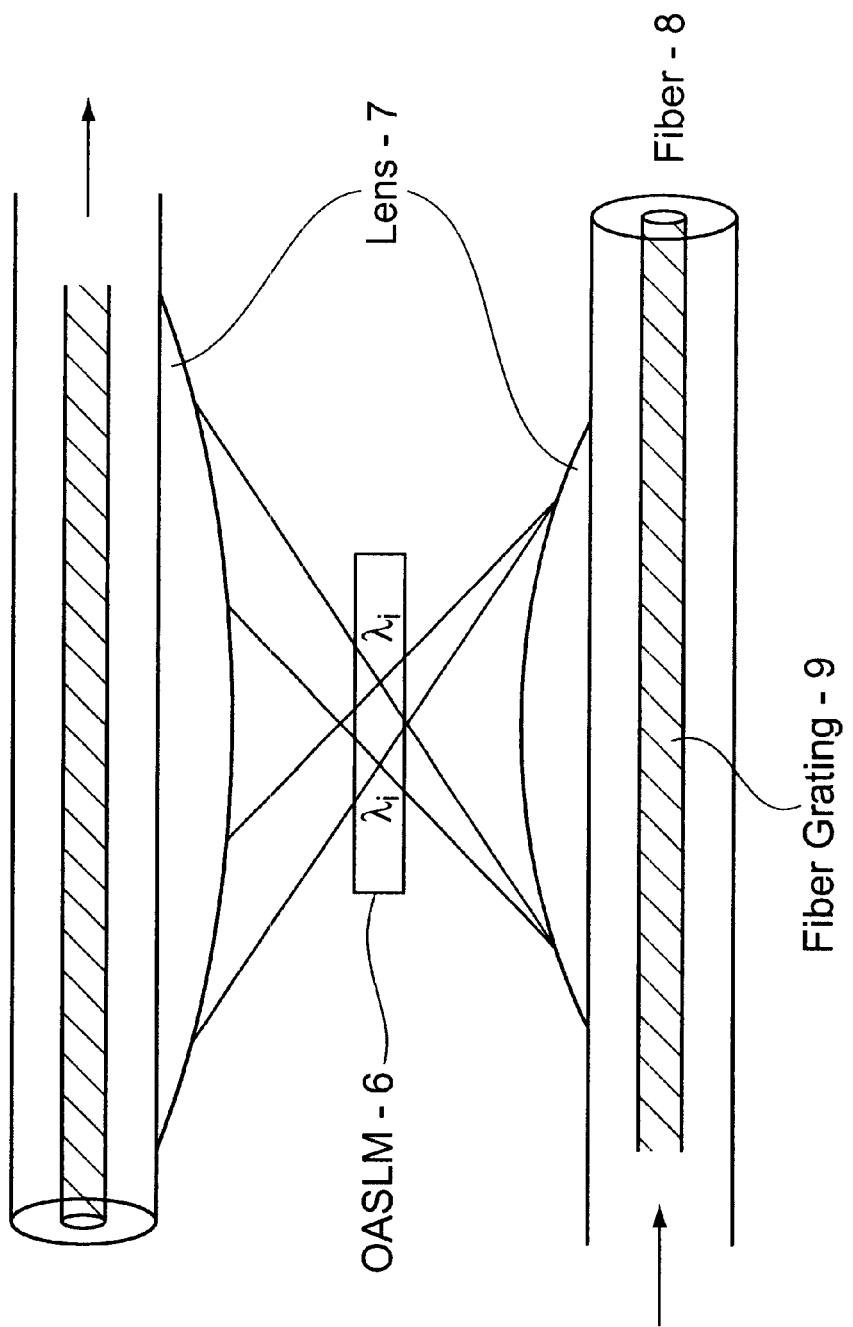
FIG. 3 shows a device with an optically addressable spatial light modulator (OASLM) between fiber gratings with anamorphotic lenses.

In FIG. 3, outcoupling and incoupling gratings 9 which can be written directly into the fiber 8 and which may possibly be combined with suitable lenses 7 on the fiber 8 itself may be used. In this FIG. 3, the light is shown spectrally split and projected onto the OASLM 6.

What is claimed is:

1. A method for spectral level balancing in a wave division multiplexing multi-channel system, the method comprising:

projecting light from a first fiber using at least one spectral splitting and at least one imaging element so as to split the light into a plurality of channels; then locally projecting the light onto the surface of an optical limiter including an optically addressed spatial light modulator so as to weaken at least one first channel of the plurality of channels more than at least one second channel of the plurality of channels using a nonlinear transmission characteristic of the optically addressed spatial light modulator; and then imaging the plurality of channels onto a point and coupling the plurality of channels into a second fiber, wherein the at least one spectral splitting element includes at least one fiber grating provided with at least one anamorphotic lens on at least one of the first fiber and the second fiber for imaging.

* * * * *